April 11, 1967 G. W. GOODRICH 3,313,940

IMAGE INTENSIFIER WITH RADIATION ATTENUATING MEMBER
FOR IMPROVING OUTPUT FIDELITY

Filed July 8, 1963 2 Sheets-Sheet 1

INVENTOR.
GEORGE W. GOODRICH

INVENTOR.
GEORGE W. GOODRICH

United States Patent Office 3,313,940
Patented Apr. 11, 1967

3,313,940

IMAGE INTENSIFIER WITH RADIATION ATTENUATING MEMBER FOR IMPROVING OUTPUT FIDELITY

George W. Goodrich, Oak Park, Mich., assignor to The Bendix Corporation, Southfield, Mich., a corporation of Delaware Filed July 8, 1963, Ser. No. 293,356
6 Claims. (Cl. 250—213)

This invention relates to an improvement in image intensifier devices and more particularly to a radiation attenuating member for substantially reducing the effects of fixed-pattern noise in said devices.

The output image of image intensifier devices is intended to be a reproduction of the spatial distribution of intensity in the incident image, the output image being amplified in intensity and sometimes being of a different type of radiation. To accomplish this end, such devices usually have a sensing surface which responds to a radiation image directed upon it; a mechanism for amplifying this response of each image element; and an agency for converting the amplified response into an output radiation image.

One of the depreciating characteristics of devices of this type is the operation of a phenomenon known as fixed-pattern noise which distorts the discrete contrast gradations of the image incident upon said devices; forming an output image of unnatural contrast. In principle, fixed pattern noise may be produced by either or all of the following occurrences; namely, (1) the radiation responsive surface may be of a nonuniform sensitivity and varying signals will be generated for identical incident excitation in different regions of the image, or (2) signals from different parts of the sensitive surface may not be uniformly amplified, or (3) the conversion may not be of a uniform efficiency over the entire image plane. As a result of any or all of these occurrences, it is apparent that the output image of an object having uniform luminosity will not be uniform itself but will be unnaturally shaded or even speckled in appearance.

This invention substantially reduces the effect of fixed-pattern noise in image intensifier devices through the utilization of a variable radiation attenuating member which equalizes the imperfect radiative conversion and transfer variations occurring in the device between the incident and output radiation images. As a result, a radiation output image is produced corresponding to the luminosity gradations of the original incident image.

An object of this invention is to provide an improved image intensifier device having substantially reduced fixed-pattern noise characteristics.

Another object of this invention is to provide an improved continuous channel image intensifier device having substantially reduced fixed-pattern noise characteristics.

Another object of this invention is to provide a radiation attenuating member which equalizes the over-all conversion and transfer characteristics of image intensifier devices.

A further object of this invention is to provide a method for producing a radiation attenuating member having spatial density variations.

Other objects and advantages will become apparent from the following detailed description and from the appended claims and drawings:

In the drawings:

FIGURE 1 is a perspective view schematically illustrating one embodiment of this invention which comprises a continuous channel image intensifier device in conjunction with a radiation attenuating member for substantially reducing the effect of fixed-pattern noise.

FIGURE 2 shows exploded views of the images represented by the incident image 6, the imperfect amplified output image 14, and the improved resultant image 18, of FIGURE 1.

Figure 1:
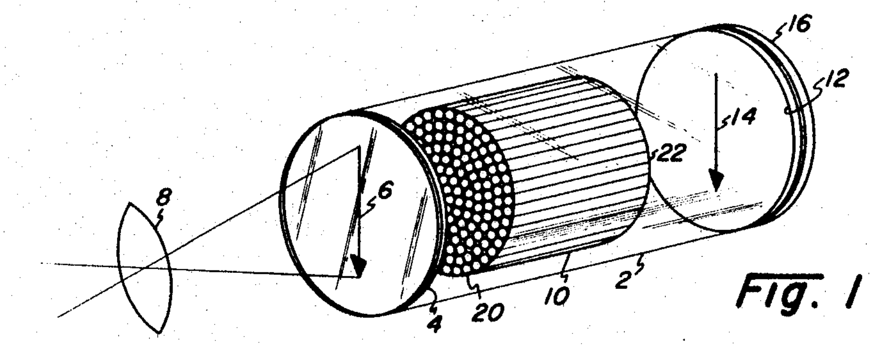
Figure 2:
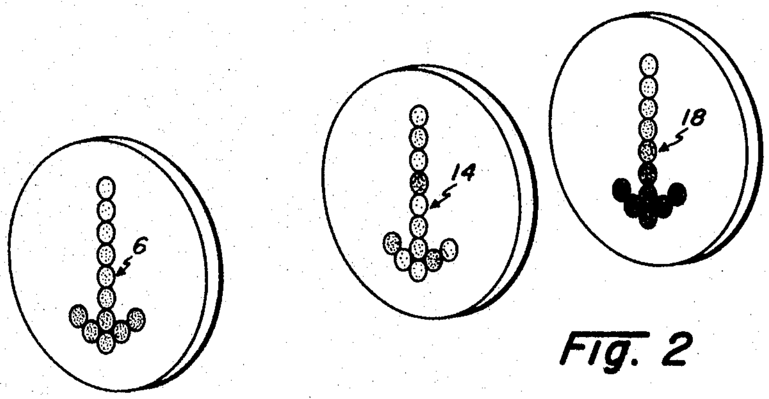

In FIGURE 1, a vacuum envelope 2 encloses a source for emitting electrons, such as a photocathode 4, which generates photoelectrons in correspondence to an incident optical image 6, which is focused upon the photocathode 4 by the lens 8. The photocathode 4 is positioned to introduce the photoelectrons to an array of amplifying continuous dynode electron multiplier channels 10 wherein the photoelectrons are amplified by a factor as great as ten million. The amplified electron current output from the array 10 is then directed upon a phosphor screen 12 which is positioned to receive the amplified electron current normally upon its surface. The phosphor screen 12 then converts the amplified incident electrons emerging from the individual channels of the array 10 into an output optical image 14 which merely approximates the incident optical image 6 in elemental contrast gradations, because of the aforementioned deteriorating characteristic of fixed-pattern noise, but which is more intense. This more intense output image 14 then impinges directly upon the variable radiation attenuating member 16 wherein the imperfect elemental contrast gradations of the amplified output image 14 are adjusted to produce a resultant output image corresponding more perfectly to the elemental contrast gradations of the incident image 6.

The operation of the embodiment described above can be briefly described as follows.

Direct current voltages, such as −2150 volts and −2000 volts are applied respectively, to the photocathode 4 and the input end 20 of the array of channel multipliers 10. Direct current voltages of 0 volts and +7000 volts are also applied respectively, to the output end 22 of the array 10 and the phosphor screen 12. As a result, a potential gradient of 150 volts exists in the region bounded by the plane of the photocathode 4 and the plane of the input end 20 of the array 10 such that photoelectrons emitted by the photocathode are accelerated and focused into the openings of the individual channels.

Channel electron multipliers of the type used to construct the array 10 are fully disclosed in co-pending U.S. application, Ser. No. 23,574, filed Apr. 20, 1960, now Patent No. 3,128,408, by George W. Goodrich and William C. Wiley. Such channel type multipliers are provided with an inside surface which is conductive and has secondary emission properties. Upon the application of the above voltages to the input end 20 and the output end 22 of the array of channel multipliers 10, a voltage potential of 2000 volts is impressed across each individual channel. Current then flows through the inside surface of each channel and produces an electric field in an axial direction through the region defined by each channel. Electrons entering the opening of the individual channel are thus multiplied through secondary emission before they emerge from the output end of the channel.

Electrons emerging from the individual channels of the array 10 then strike the phosphor screen 12, because of the accelerating influence of the voltage potential of 7000 volts existing in the region between the plane of the array output end 22 and the plane of the phosphor screen 12, producing an amplified output image 14 which is then variably attenuated by the radiation attenuating member 16, producing a resultant output image 18 corresponding in elemental contrast gradation to the incident input image 6.

One method for preparing an appropriate radiation attenuating member is as follows:

A light sensitive material, such as the silver bromide emulsion commonly used in photography, is inserted in a position immediately following the phosphor screen of the particular image intensifier tube to be improved. The photocathode of the tube is illuminated uniformly over its entire surface at a suitable level while the tube is functioning in the normal manner. Clearly, those parts of the emulsion which are adjacent to areas of high amplification are exposed to a greater extent than those areas of the emulsion which are adjacent to areas of low amplification. The emulsion is then developed and the areas which received the greatest exposure now offer the greatest attenuation to the passage of light. When the process is carried out in the region of the emulsion exposure characteristics in which the optical attenuation of the film is directly proportional to the exposure, then compensation is optimized. Of course, it is desirable to reach this point with as little darkening of the emulsion as possible to minimize the average attenuation of the emulsion since this corresponds to a loss of gain.

Figure 3:
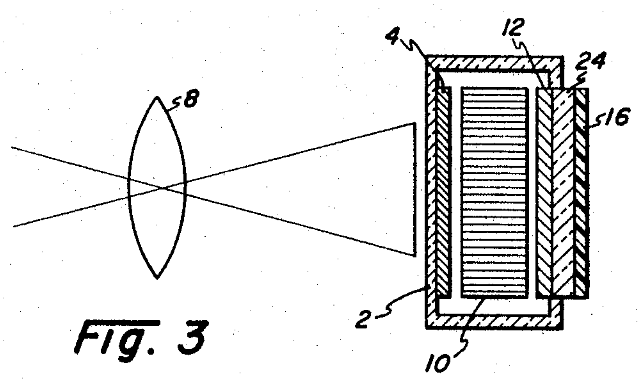
FIGURE 3 is a plan view illustrating another embodiment of the invention comprising a continuous channel image intensifier device employing a coupling fiber optics plate in conjunction with a radiation attenuating member.

In another embodiment of the invention, shown in FIGURE 3, the radiation attenuating member 16 is placed on a fiber optics plate 24 which directly couples the radiation attenuating member 16 to the phosphor screen 12. As known to persons skilled in the art, a fiber optics plate consists of an aligned bundle of fibers which can transmit light through thin fibers of glass, plastic, or other transparent material. Such a plate can shift a complete image, element by element, from place to place without impairment of resolution.

Figure 4:
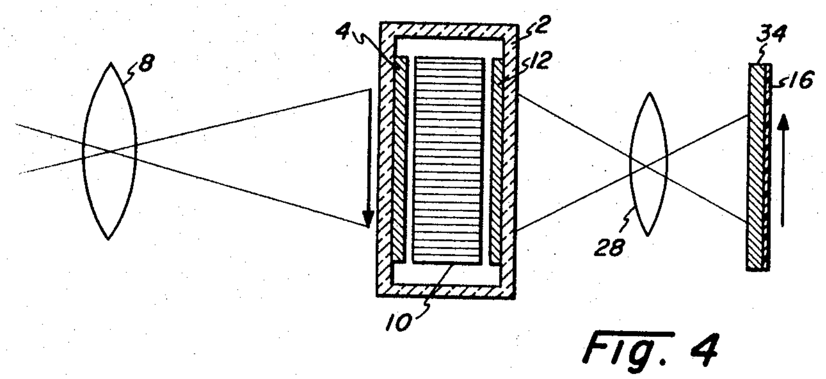
FIGURE 4 is a plan view illustrating still another embodiment of the invention comprising an optical focusing lens positioned between the continuous channel image intensifier phosphor screen and the radiation attenuating member.

In still another embodiment of the invention, shown in FIGURE 4, the radiation attenuating member 16 is positioned upon a transparent substrate 34 in the image plane of a lens 28 of an optical system used to view the phosphor screen 12. This configuration also gives good resolution since the lens 28 focuses directly upon the image in the plane of the phosphor screen 12.

Figure 5:
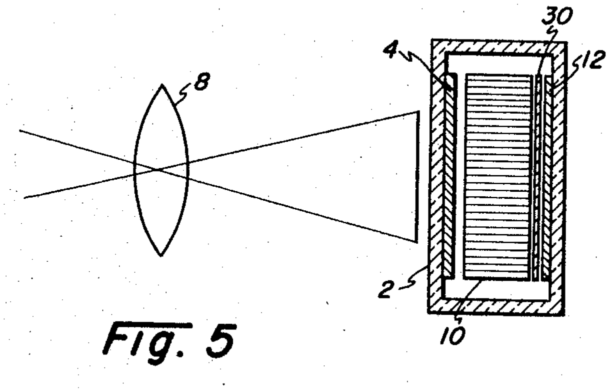
FIGURE 5 shows an embodiment in which a screen is utilized to variably attenuate electrons prior to conversion at the phosphor screen.

In the embodiment of the invention, shown in FIGURE 5, the radiation attenuating member 30 is positioned in a plane to receive and attenuate electrons before their impingement upon the phosphor screen 12; said member 30 being comprised of a screening material which variably attenuates electrons due to discrete holes of different diameters. A radiation attenuating member of this nature may be produced by photomachining or photoetching processes. The photoetching may be done in the well known manner described in the Kodak Photosensitive Resists for Industry (P–7) © 1962, Eastman Kodak Company, Rochester, New York.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. An image intensifier device comprising,
a first radiation responsive surface disposed to receive an incident radiation image,
a second radiation responsive surface disposed to receive the response from the first radiation responsive surface,
a radiation amplifying member being located between said first and second radiation responsive surfaces with the input end of said amplifier member receiving the output of said first radiation responsive surface and the output end of said amplifier member directing the amplified image to said second radiation responsive surface,
and radiation attenuating means disposed on the output side of said amplifying member and having spatial density variations disposed so that the resulting attenuation occurring to the amplified signal will preserve signal fidelity and equalize radiation conversion and transfer mechanisms within said device.

2. The device of claim 1 with
said second radiation responsive surface comprising a phosphor screen,
said radiation attenuating member placed at the light emitting side of the phosphor screen,
said radiation attenuating member comprising a light sensitive emulsion.

3. An image intensifier device comprising,
an air evacuated envelope,
a photocathode disposed in the envelope to receive an incident light image,
an array of continuous dynode electron multiplier channels disposed in the envelope to receive the electrons emitted by the photocathode, said array to receive the output of said photocathode, multiply said photocathode output, and discharge the multiplied output,
a phosphor screen disposed in the envelope to receive electrons emitted by said channels,
and a radiation attenuating member disposed in close proximity to the phosphor screen on the discharge side of said multiplier channels,
said attenuating member having spatial density variations which egualize radiation conversion and transfer mechanisms within said devices.

4. An image intensifier device according to claim 3 wherein the radiation attenuating member is disposed in contiguous relationship to the phosphor screen.

5. An image intensifier device according to claim 3 including in addition a fiber optics plate disposed between and in contiguous relationship to the phosphor screen and the radiation attenuating member.

6. The device of claim 3 with
said radiation attenuating member comprising a light sensitive emulsion having attenuating portions corresponding to the electron multiplier channels with the channels of higher gain being attenuated to a greater degree than the channels of lower gain.

References Cited by the Examiner

UNITED STATES PATENTS

| | | | |
|---|---|---|---|
| 1,808,743 | 6/1931 | Barkelew | 88—24 |
| 2,701,196 | 2/1955 | Conrad | 88—24 |
| 3,062,962 | 11/1962 | McGee | 250—213 |
| 3,149,968 | 9/1964 | Stephens | 178—7.82 X |

FOREIGN PATENTS

| | | |
|---|---|---|
| 841,200 | 7/1960 | Great Britain. |

RALPH G. NILSON, *Primary Examiner.*

WALTER STOLWEIN, ARCHIE R. BORCHELT, *Examiners.*

M. A. LEAVITT, *Assistant Examiner.*